(12) United States Patent
Povey et al.

(10) Patent No.: US 10,775,811 B2
(45) Date of Patent: Sep. 15, 2020

(54) DEVICE FOR CONTROLLING FLUID FLOW

(71) Applicant: OXFORD FLOW LIMITED, Oxford (GB)

(72) Inventors: Thomas Povey, Oxford (GB); Matthew Collins, Oxford (GB)

(73) Assignee: OXFORD FLOW LIMITED, Oxford (GB)

( * ) Notice: Subject to any disclaimer, the term of this patent is extended or adjusted under 35 U.S.C. 154(b) by 0 days.

(21) Appl. No.: 16/096,637

(22) PCT Filed: Apr. 25, 2017

(86) PCT No.: PCT/GB2017/051151
§ 371 (c)(1),
(2) Date: Oct. 25, 2018

(87) PCT Pub. No.: WO2017/187159
PCT Pub. Date: Nov. 2, 2017

(65) Prior Publication Data
US 2019/0163211 A1 May 30, 2019

(30) Foreign Application Priority Data

Apr. 26, 2016 (GB) .................................. 1607225.8

(51) Int. Cl.
*F16K 47/08* (2006.01)
*G05D 16/10* (2006.01)
*G05D 16/18* (2006.01)

(52) U.S. Cl.
CPC ......... *G05D 16/106* (2013.01); *G05D 16/187* (2019.01); *Y10T 137/86759* (2015.04)

(58) Field of Classification Search
CPC . Y10T 137/3367–353; Y10T 137/7788; Y10T 137/86718; Y10T 137/86734; Y10T 137/86759; Y10T 137/86791; F16K 47/08
(Continued)

(56) References Cited

U.S. PATENT DOCUMENTS

| 43,949 A | * | 8/1864 | Miller | ..................... F16K 47/08 137/625.37 |
| 2,835,271 A | | 5/1958 | Oberthur | |

(Continued)

FOREIGN PATENT DOCUMENTS

| FR | 2305774 A1 | 10/1976 |
| WO | 2013068747 A1 | 5/2013 |

OTHER PUBLICATIONS

Search Report for United Kingdom Patent Application No. GB1607225.8, dated Oct. 31, 2016, 3 pages.
(Continued)

*Primary Examiner* — Robert K Arundale
(74) *Attorney, Agent, or Firm* — Withrow & Terranova, P.L.L.C.; Vincent K. Gustafson

(57) ABSTRACT

A device (1) for controlling the flow of a fluid through a conduit (3) from an upstream side (8) to a downstream side (10). The device includes one or more valve apertures (6) through which the flow of fluid is selectively controlled. A valve member (12) is arranged to move reciprocally to selectively open and close the one or more valve apertures. The device includes a stop (18) for arresting the travel of the valve member arranged at or beyond a position the valve member reaches when at least some of the one or more valve apertures are open. The valve member includes an end portion (13) arranged to come into contact with the stop when the valve member reaches or passes the position at which at least some of the one or more valve apertures are open and a body portion (9).

20 Claims, 1 Drawing Sheet

(58) Field of Classification Search
USPC .......................................................... 251/63
See application file for complete search history.

(56) References Cited

U.S. PATENT DOCUMENTS

| | | | | |
|---|---|---|---|---|
| 4,041,982 A * | 8/1977 | Lindner | ................... | F16K 47/08 |
| | | | | 137/625.3 |
| 4,330,012 A * | 5/1982 | Chadwick | ............. | F16K 11/065 |
| | | | | 137/219 |
| 4,471,810 A * | 9/1984 | Muchow | ................. | F16K 39/04 |
| | | | | 137/625.37 |
| 6,216,721 B1 * | 4/2001 | Perez | ...................... | F16K 1/126 |
| | | | | 137/219 |
| 2005/0115619 A1 * | 6/2005 | Kawulka | ................. | E21B 43/12 |
| | | | | 137/625.33 |

OTHER PUBLICATIONS

International Preliminary Report on Patentability for PCT/GB2017/051151, dated Nov. 8, 2018, 8 pages.
International Search Report and Written Opinion for PCT/GB2017/051151, dated Aug. 1, 2017, 13 pages.

* cited by examiner

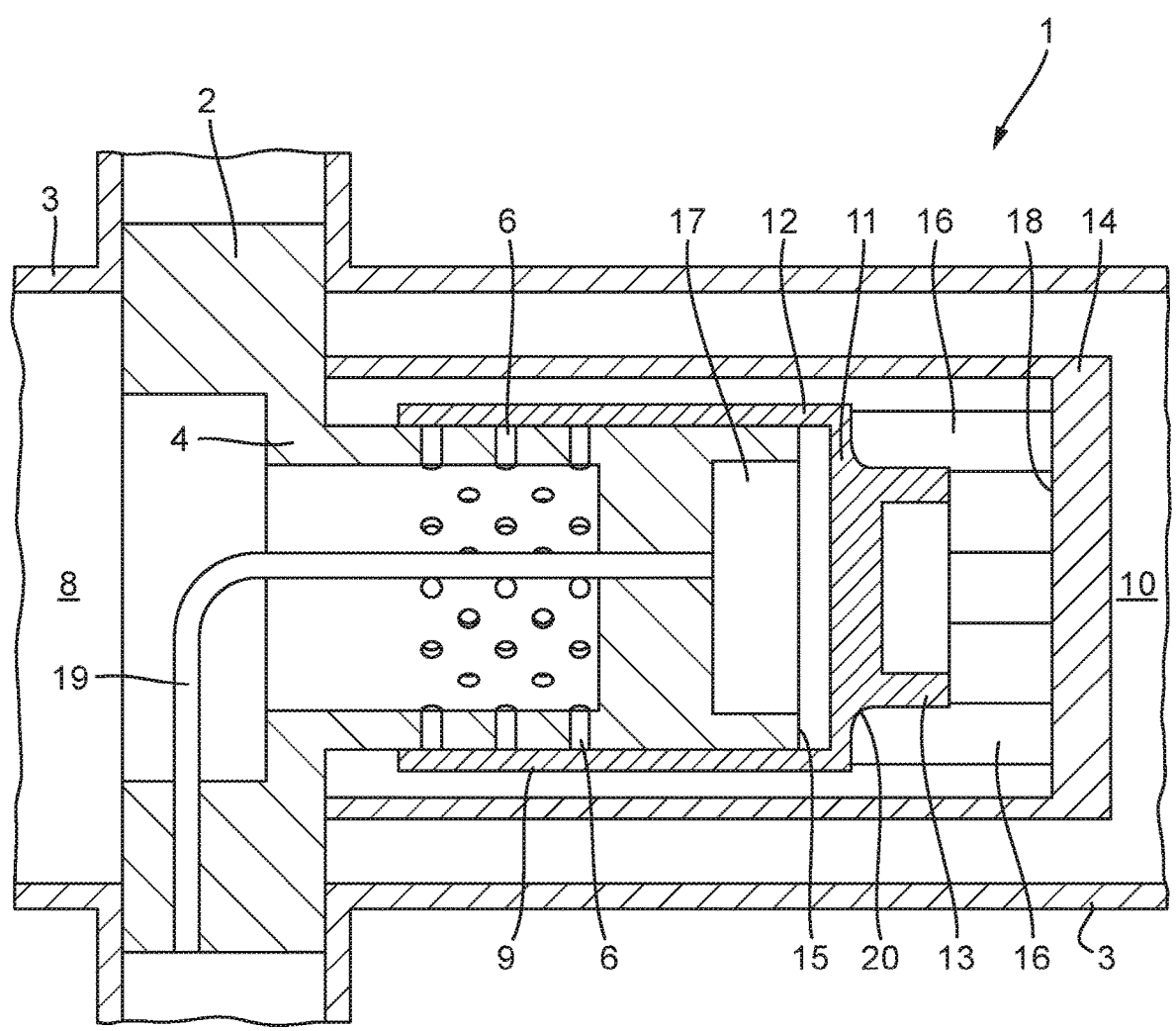

DEVICE FOR CONTROLLING FLUID FLOW

This application is a 35 U.S.C. § 371 national phase filing of International Application No. PCT/GB2017/051151 filed on Apr. 25, 2017, and claims the benefit of United Kingdom Patent Application No 1607225.8 filed on Apr. 26, 2016, wherein the disclosures of the foregoing applications are hereby incorporated by reference herein in their respective entireties.

This invention relates to a device for controlling the flow of fluid therethrough, in particular to a device including a valve member for opening and closing a valve aperture to control the flow of fluid through the device.

In fluid flow systems such as pipes and conduits, e.g. as can be found in many different industrial situations, there is a need to regulate the pressure in a fluid flow stream. In such systems there is an input pressure that may be constant or fluctuating in time and which it is desired to control to a lower target output pressure, which also can be constant or fluctuating.

One example of such devices is a pressure regulator as disclosed in the Applicant's previous application WO 2013/068747 A1 which is arranged to control the downstream pressure in a conduit. The flow through the pressure regulator is selectively controlled by a valve member that opens and closes a plurality of valve apertures dependent upon the difference between the pressure in the downstream side of the conduit and a reference pressure that is arranged to act on the valve member.

In such designs the force on the device, and the valve member in particular, is often very large when the valve member (and thus the valve apertures) are fully open, owing to the pressure associated with the maximum flow rate through the device in this configuration. It is therefore important to provide a valve member that is robust to such operating conditions.

It is an object of the invention to provide a device for controlling the flow of a fluid through a conduit with an improved valve member design.

When viewed from a first aspect the invention provides a device for controlling the flow of a fluid through a conduit from an upstream side of the device to a downstream side of the device, the device comprising:

one or more valve apertures through which the flow of fluid is selectively controlled;

a valve member arranged to move reciprocally to selectively open and close the one or more valve apertures, thereby controlling flow of the fluid through the one or more valve apertures;

a stop for arresting the travel of the valve member arranged at or beyond a position the valve member reaches when at least some of the one or more valve apertures are open; and wherein the valve member comprises an end portion arranged to come into contact with the stop when the valve member reaches or passes the position at which at least some of the one or more valve apertures are open and a body portion, the end portion projects from the body portion in a direction towards the stop, the end portion and the body portion each have a maximum dimension in a direction substantially perpendicular to the direction in which the end portion projects from the body portion, and the maximum dimension of the end portion is less than the maximum dimension of the body portion.

The present invention provides a device for controlling (e.g. pressure regulating) the flow of fluid through a conduit (e.g. in which the device is placed). The flow of fluid through the device is selectively controlled between an upstream side of the device and a downstream side of the device, with one or more valve apertures of the device, for example, defining the boundary between the upstream and downstream sides. The flow of fluid through the one or more valve apertures, and thus through the device from the upstream side to the downstream side, is controlled by a valve member. The valve member is arranged to move reciprocally (e.g. with respect to the one or more valve apertures) to selectively open and close the one or more valve apertures.

A stop is positioned in the device at or beyond a point that the valve member travels to once it has opened at least some of the one or more valve apertures. The valve member and the stop are arranged such that when the valve member reaches or exceeds the point at which it has opened at least some of the one or more valve apertures, the valve member comes into contact with the stop, which arrests (stops) the movement of the valve member beyond this point.

The valve member comprises a body portion and an end portion that projects from the body portion in a direction towards to the stop. Thus when the valve member comes into contact with the stop, it is the end portion of the valve member that contacts the stop. The end portion of the valve member is smaller than the body portion in a direction substantially perpendicular to the direction towards to the stop.

Thus it will be appreciated that the fluid flow control device (e.g. pressure regulator or control device) of the present invention has a valve member with an end portion that is (at least partly) displaced from the main body portion of the valve member. This cantilevered design of the valve member helps to reduce the stresses placed on the body portion of the valve member (e.g. compared to if the valve member did not have an end portion projecting from the body portion), particularly in the region of the body portion that is outward of (i.e. at a greater dimension than) end portion, when the (end portion of the) valve member comes into contact with the stop.

These reduced stresses on the valve member may, e.g. in preferred embodiments, allow the mass of the valve member to be reduced, which may reduce the cost of manufacturing the fluid flow control device and may make it more responsive, e.g. to changes in pressure.

Providing a valve member having an end portion that has a smaller maximum dimension than the maximum dimension of the body portion of the valve member also helps to increase the flow capacity of the device, owing to the flow area past the end portion of the valve member being greater than if the body portion simply extended at the same dimension to its end.

The valve member could simply be arranged within the conduit to open and close the one or more valve apertures, which could be arranged in the valve member itself, e.g. with the one or more apertures in the valve member moving either side of a wall within the conduit, or they could be arranged in another component, e.g. a wall or flange within the conduit. However, in a preferred set of embodiments, the device comprises a housing which comprises the one or more valve apertures, i.e. the one or more valve apertures are provided in the housing, e.g. through a wall of the housing. In this set of embodiments, preferably the valve member is movably mounted with respect to, e.g. on, the housing.

The device could comprise a single aperture, e.g. defined in the housing, through which the flow of fluid is controlled by the valve member. However in one set of embodiments the device comprises a plurality of apertures, e.g. defined in the housing, through which the flow of fluid is controlled by the valve member. Providing a plurality of apertures allows for greater control over the accuracy in which the flow of fluid is controlled through the device. For example, the apertures could be arranged such that the valve member closes a proportion of the apertures at a certain pressure, leaving the remaining apertures open, e.g. when the valve member is at an intermediate position in its distance of travel.

This is achieved, in one set of embodiments by spacing the apertures in the direction parallel to the direction of reciprocal motion of the valve member, e.g. along the housing. It will be appreciated that the greater the number of apertures the device comprises, the finer the control over the proportion of the apertures that are open. Therefore in a preferred set of embodiments the device comprises at least 10 apertures through which the flow of fluid is controlled by the valve member, e.g. at least 20, e.g. at least 40, e.g. about 60 apertures. The plurality of apertures could also be spaced in the direction perpendicular to the direction of reciprocal motion of the valve member, e.g. around the housing.

The housing, in which the one or more valve apertures are defined, may have any suitable and desired configuration. In a preferred embodiment the housing comprises a (e.g. hollow) cylinder, e.g. with the one or more valve apertures defined in (e.g. extending radially through) the wall of the cylinder.

Thus preferably the body portion of the valve member comprises a cylinder mounted on the, e.g. outside of the, housing. In one particularly preferred embodiment the housing comprises a cylinder (in which the one or more valve apertures are defined) and a cylindrical valve member is mounted coaxially on the outside of the housing and arranged to move reciprocally in a direction in which the cylindrical housing and valve member are cylindrically extended (i.e. parallel to the main axis of the cylinders). Preferably the direction in which the valve member is arranged to move reciprocally is parallel to the direction in which the end portion projects from the body portion towards the stop.

Thus preferably the end portion of the valve member that comes into contact with the stop comprises a cylinder having a diameter that is smaller than the diameter of the cylindrical body portion. Similarly, while the stop may comprise any suitable and desired shape, preferably the stop (against which the, e.g., cylindrical end portion of the valve member comes into contact) is circular.

The device (preferably via the housing) may be mounted in the conduit in any suitable and desired way, e.g. integrally formed with (e.g. a section of) the conduit. However preferably the device is provided as a separate structure within the conduit and thus in a preferred embodiment the device comprises a flange for mounting the device within the conduit (e.g. for attaching the device to the conduit), wherein the housing is attached to, e.g. integrally formed with, the flange. Preferably the flange is radially extending, e.g. in a plane perpendicular to the main cylindrical axis of the housing.

Preferably the flange is arranged for mounting the device in the conduit, e.g. for suspending the device within the conduit, preferably so that the device (and thus the housing and the valve member) is arranged to be mounted coaxially within the conduit. The housing may be arranged with respect to the flange in any suitable and desired configuration. Preferably the housing projects (in the direction of its main cylindrical axis) perpendicularly to the plane of the flange. The housing may project from the flange in an upstream direction or in downstream and upstream directions (i.e. the housing may extend through the flange in both of these directions) but preferably the housing projects from the flange in a downstream direction (e.g. preferably the flange forms the upstream extent of the device).

In a preferred embodiment the flange, together with the housing in which the one or more apertures are defined, defines the boundary between the upstream and downstream sides of the device. Thus preferably, when the valve member closes all of the one or more valve apertures, the flange, the housing and the valve member act to form a barrier between the upstream and downstream sides of the conduit in order to prevent the flow of fluid through the device.

The valve member, and the (body and end) portions thereof, may be configured in any suitable and desired way, e.g. comprising cylindrical body and/or end portions.

In one embodiment the body portion of the valve member comprises a cylinder having a closed planar end to which the end portion is attached (preferably the end portion is integrally formed with the body portion). Preferably the other end of the (body portion of the) valve member is open (e.g. to receive the housing on which it is, e.g., mounted). Thus preferably the valve member is in the form of a cap that fits over the housing.

Preferably the planar end of the body portion is perpendicular to its cylindrical sides (and thus preferably also to the main cylindrical axis of the valve member and, e.g., to the direction in which the end portion projects towards the stop). Thus, at least in preferred embodiments, the body portion of the valve member comprises a, e.g. right angled, corner where the cylindrical sides join to the planar end.

It will be appreciated that it is at this corner that the stresses, which may be reduced by providing a projecting end portion for coming into contact with the stop (compared to if the valve member were not to have an end portion projecting from the body portion), are likely to be the highest (and thus in most need of being reduced). By reducing the stresses (e.g. which may be by a factor of up to 4 as a result of providing the projecting end portion), the deformation of this corner at high pressures may be reduced owing to the more balanced forces in this arrangement (by the provision of the cantilever action from the end portion). (It will be appreciated that the moment generated by the end portion on the body portion when it contacts the stop acts to counter the deformation at the corner of the body portion.)

The end portion of the valve member may be configured in any suitable and desired way (e.g. its shape and its positioning relative to the body portion of the valve member). In a preferred embodiment the end portion is displaced inwardly, e.g. stepped, from the edge of the body portion. Preferably the end portion is displaced inwardly (e.g. in a direction towards the centre, e.g. the main cylindrical axis, of the body portion) from the entire perimeter (e.g. circumference) of the body portion. For example, the end portion (having a smaller maximum dimension that the body portion) may be centred on the, e.g. planar end of the, body portion. Thus, in a particularly preferred embodiment, e.g. when the body portion comprises a cylinder, the (e.g. cylindrical) end portion is coaxial with the body portion.

The end portion may have any suitable and desired dimensions, e.g. relative to the dimensions of the body portion of the valve member. In a preferred embodiment the ratio of the maximum dimension (in a direction substantially perpendicular to the direction in which the end portion projects from the body portion), e.g. diameter, of the end portion to the maximum internal dimension (in a direction substantially perpendicular to the direction in which the end portion projects from the body portion), e.g. internal diameter, of the body portion is between 0.4 and 0.9, e.g. between 0.5 and 0.8, e.g. approximately 0.65.

The end portion may be solid, e.g. a cylindrical disc that projects from the body portion of the valve member towards the stop. However in a preferred embodiment the (e.g. cylindrical) end portion is hollow, e.g. the end portion may comprise a recess on the side of the end portion closest to the stop. Preferably the end portion comprises an (e.g. cylindrical) annulus that projects from the body portion of the valve member towards the stop. Thus the end portion of the valve member may comprise a wall that is displaced from the edge of the body portion (and, e.g., comprising a recess or void within the wall).

In a particularly preferred embodiment the valve member comprises a hollow cylindrical body portion having a planar end to which is attached an end portion comprising a cylindrical annulus, wherein the diameter of the cylindrical annulus is less than the diameter of the cylindrical body portion. Preferably the cylindrical annulus is coaxial with the cylindrical body portion. Preferably the cylindrical annulus defines within it a hollow void that is open towards the stop, e.g. preferably the shape of the end portion of the valve member that comes into contact with the stop is a (e.g. circular) ring.

Providing a recessed, e.g. hollow, end portion, e.g. a cylindrical annulus, helps to minimise the mass of the valve member and may also help to reduce the contact force between the end portion and the stop on lift-off of the valve member from the stop (e.g. compared to the contact force if the end portion were solid). A recessed end portion may also reduce the tolerance to which the end portion needs to be manufactured, e.g. rather than having to manufacture a (solid) flat end portion (e.g. a disc), for aligning with the stop. Furthermore, a recessed end portion may also allow a place for locating a tool, e.g. a sensor, for pressure testing of the device.

As has been outlined above, the displaced end portion of the valve member may help to reduce the mass of the valve member, e.g. helping to minimise the thickness of the wall of a hollow body portion of the valve member, owing to the reduced stresses on the valve member when it comes into contact with the stop. The reduced stresses may also allow the valve member to be manufactured without a fillet, e.g. for strengthening the valve member, on the inside of the hollow valve member, e.g. at the corner between the cylindrical sides and the end of the body portion. Thus, in the embodiment in which the body portion of the valve member is hollow and comprises cylindrical sides and a planar end having a corner therebetween, preferably the corner between the cylindrical sides and the planar end on the inside of the valve member is right angled, i.e. does not comprise a fillet.

Not having to fillet the inside of the valve member helps the manufacturing of the valve member, as this may be difficult to machine on the inside of the valve member. Furthermore, when the valve member is mounted on the outside of a housing, not having a fillet helps to avoid having to provide a matching curved corner on the housing. This helps to maximise the operating length of the valve member as a fraction of its total length, and thus helps to minimise the mass of the valve member.

In a preferred embodiment the external corner at the join between the end portion and the (e.g. planar end of the) body portion comprises a fillet. This fillet helps to strengthen the valve member at this corner join and is relatively easy to machine, as it is on the outside of the valve member. The fillet may have any suitable and desired radius of curvature.

In a preferred embodiment the ratio of the radius of curvature of the fillet to the maximum internal dimension (in a direction substantially perpendicular to the direction in which the end portion projects from the body portion), e.g. internal diameter, of the body portion is between 0.01 to 0.2, e.g. between 0.025 to 0.125, e.g. approximately 0.06.

The end portion may have any suitable and desired dimensions, e.g. relative to the body portion of the valve member. In one embodiment the dimension of the projection of the end portion from the body portion towards the stop is approximately equal to or greater than the dimension by which the end portion is displaced from the edge of the body portion. Alternatively, the dimension of the projection of the end portion projects from the body portion towards the stop is approximately equal to or greater than half of the difference between the maximum dimension of the end portion and the maximum dimension of the body portion in a direction substantially perpendicular to the direction in which the end portion projects from the body portion. The distance by which the end portion of the valve member projects from the body portion may be tailored to control the travel of the valve member, and thus to control the proportion of the valve apertures that are opened when the valve member is fully open (e.g. for a given housing and pattern of the valve apertures).

The stop, for arresting the travel of the valve member, which is arranged at or beyond a position the valve member reaches when at least some of the one or more valve apertures are open, may have any suitable and desired form. Preferably the stop has a surface, against which the end portion of the valve member is arranged to contact, having a profile that matches the profile of the end portion that comes into contact with the stop, e.g. the stop and the end portion of the valve member each comprise complementary mating surfaces that are arranged to come into contact with each other. Preferably the stop comprises a planar surface against which the, e.g. planar surface of the, end portion of the valve member is arranged to contact. Thus preferably the end portion comprises a planar face, e.g. the (circular) rim of the annulus lies in a plane, that is arranged to come into contact with the stop.

In another embodiment the stop comprises an annulus (e.g. comprising a planar (circular) rim) against which the end portion of the valve member is arranged to come into contact. This may be provided instead of or as well as an annular end portion, e.g. to help to reduce the contact force between the end portion and the stop on lift-off.

The stop may be provided at any suitable and desired position relative to the rest of the device, e.g. the valve member and/or the housing, such that the (end portion of the) valve member comes into contact with the stop when at least some of the one or more valve apertures are open. Preferably the (end portion of the) valve member comes into contact with the stop when all of the one or more valve apertures are (e.g. fully) open.

The stop may be positioned relative to the rest of the device, e.g. the valve member, the one or more valve apertures and/or the housing, in any suitable and desired way. In one embodiment the stop is arranged at a fixed position relative to the one or more valve apertures, e.g. at a fixed position relative to the housing that comprises the one or more valve apertures. Preferably the stop is connected to the housing and/or to the flange of the device (in the embodiments that comprise one or both of these components).

The stop may be connected to the housing and/or to the flange in any suitable and desired way. Preferably the device comprises a casing attached to the housing and/or to the flange, wherein the casing comprises the stop. Preferably the casing is arranged on the downstream side of the device, e.g. downstream from the one or more valve apertures, and comprises one or more apertures arranged to allow fluid flowing through the device to pass into the downstream side of the conduit.

In a particularly preferred embodiment the casing surrounds the housing and the valve member. Preferably the casing is arranged coaxially with the housing and the valve member.

The valve member and/or the stop (and/or the housing when provided) may be made from any suitable and desired material(s). However, owing to the reasons outlined above, preferably the housing the valve member are rigid. Thus the housing and/or valve member could be made from a plastic but preferably the housing and/or the valve member comprise a metal.

A preferred embodiment of the invention will now be described, by way of example only, with reference to the accompanying drawing in which:

FIG. 1 shows a cross-section view of a fluid flow control device in accordance with an embodiment of the present invention.

There are many different industrial situations in which there is a desire to regulate the pressure in a fluid flow stream through a pipe or conduit. In such systems there is an input pressure that may be constant or fluctuating in time and which it is desired to control to a lower target output pressure, which also can be constant or fluctuating. As will now be described, embodiments of the present invention provide devices that are able to provide this control for the fluid flow.

FIG. 1 shows a cross-sectional view of a fluid flow control device 1 in accordance with an embodiment of the present invention. The device 1, e.g. a pressure regulator, includes a metal flange 2 for mounting the device 1 in a section of pipe 3, e.g. clamped between a joint in the pipework. The device also includes a metal housing 4 that has a cylindrical body in which a plurality of valve apertures 6, extending axially through the cylindrical housing 4, are formed. The housing 4 is attached to and extends perpendicularly to the flange 2, projecting into a downstream side 10 of the pipe 3.

The plurality of valve apertures 6 allow fluid to pass from an upstream side 8 of the pipe 3 to the downstream side 10 of the pipe 3. The flow of the fluid through the plurality of valve apertures 6 is controlled by a cylindrical metal valve member 12 that is mounted coaxially on the outside of the cylindrical housing 4, and arranged to move reciprocally in a direction parallel to the main cylindrical axis of the housing 4 and the valve member 12.

The valve member 12 has a cylindrical body portion 9 that acts to open and close the valve apertures 6 and a planar end 11 that is arranged to abut the end 15 of the housing 4 when the valve member 12 is fully closed, i.e. when it is covering all of the valve apertures 6. An annular end portion 13 is formed on the planar end 11 of the valve member 12, with the annular end portion 13 having a diameter that is less than and displaced inwardly from the diameter of the cylindrical body portion 9 of the valve member 12. The external corner between the planar end 11 and the annular end portion 13 of the valve member 12 comprises a fillet 20 to strengthen the corner.

The housing 4 is mounted on the flange 2, along with an outer casing 14 (in which a plurality of apertures 16 are formed), such that the planar inner end surface of the outer casing 14 defines a "stop" 18 against which the annular end portion 13 of the valve member 12 contacts when the valve member 12 is fully open. As can be seen from FIG. 1, the annular end portion 13 of the valve member 12 projects towards the stop 18.

A plenum chamber 17, defined between the end 15 of the housing 4 and the planar end 11 of the valve member 12, allows a reference pressure to be introduced via a pipe 19, e.g. from a pilot pressure regulator (not shown).

Operation of the fluid flow control device 1 in accordance with this embodiment of the invention will now be described with reference to FIG. 1.

With the fluid flow control device 1 installed in a pipe 3, i.e. mounted in the pipe 3 by its flange 2, and with a reference pressure introduced into the plenum chamber 17 via the pipe 19 from a pilot pressure regulator (not shown), variations in the pressures in the pipe 3 on the upstream 8 and downstream 10 sides of the device 1 cause the valve member 12 to move reciprocally to open and close the plurality of valve apertures 6 in the housing 4, in order to control the flow of fluid through the device 1.

When the valve member 12 opens fully and thus opens all the plurality of valve apertures 6 in the housing 4, the annular end portion 13 of the valve member 12 abuts against the planar stop 18 of the casing 14. In this position, with the plurality of valve apertures 6 fully open and thus a large flow rate of fluid through the device 1, the pressure on the valve member 12, and particularly on the corner between the cylindrical body portion 9 and the planar end 11 of the valve member 12, can be very large.

This pressure on the corner of the valve member 12 acts to deform it. However, the moment generated by the force of the stop 18 of the casing 14 against the annular end portion 13 of the valve member 12, owing to the annular end portion 13 being displaced inwardly from the edge of the cylindrical body portion 9 of the valve member 12, acts to counter this deformation, i.e. to retain the shape of the valve member 12. It will be appreciated that this prevention of the deformation allows the thickness of the valve member 12 to be minimised, thus minimising its mass.

In a particular example, the Applicant has found that the stress on the corner between the cylindrical body portion 9 and the planar end 11 of the valve member 12 is reduced from 330 MPa (in a valve member not having an inwardly displaced end portion) to 86 MPa, owing to the annular end portion 13 being displaced inwardly from the edge of the cylindrical body portion 9 of the valve member 12.

It can be seen from the above that in at least preferred embodiments, the fluid control flow device of the present invention provides a device, for controlling the flow in a conduit, that includes a valve member with an end portion that is (at least partly) displaced from the main body portion of the valve member. This cantilevered design of the valve member helps to reduce the stresses placed on the body portion of the valve member (e.g. compared to if the valve member did not have an end portion projecting from the body portion), particularly in the region of the body portion that is outward of (i.e. at a greater dimension than) end portion, when the (end portion of the) valve member comes into contact with the stop.

The invention claimed is:
1. A device for controlling the flow of a fluid through a conduit from an upstream side of the device to a downstream side of the device, the device comprising:
   a housing comprising one or more valve apertures through which the flow of fluid is selectively controlled;

a valve member arranged to move reciprocally to selectively open and close the one or more valve apertures, thereby controlling flow of the fluid through the one or more valve apertures;

a stop for arresting the travel of the valve member arranged at or beyond a position the valve member reaches when at least some valve apertures of the one or more valve apertures are open; and wherein the valve member comprises a cap that fits over the housing, the valve member comprising an end portion arranged to come into contact with the stop when the valve member reaches or passes the position at which at least some of the one or more valve apertures are open, and comprises a body portion, wherein the end portion projects from a closed planar end of the body portion in a direction towards the stop, the end portion and the body portion each have a maximum dimension in a direction substantially perpendicular to the direction in which the end portion projects from the body portion, and the maximum dimension of the end portion is less than the maximum dimension of the body portion.

2. The device as claimed in claim 1, wherein the valve member is movably mounted with respect to the housing.

3. The device as claimed in claim 2, wherein the housing comprises a cylinder and the body portion of the valve member comprises a cylinder mounted on the cylindrical housing.

4. The device as claimed in claim 3, wherein the end portion of the valve member comprises a cylinder having a diameter that is smaller than the diameter of the cylindrical body portion of the valve member.

5. The device as claimed in claim 2, the device further comprising a flange for mounting the device as a separate structure within the conduit, wherein the housing is attached to the flange.

6. The device as claimed in claim 1, wherein the direction in which the valve member is arranged to move reciprocally is parallel to the direction in which the end portion projects from the body portion towards the stop.

7. The device as claimed in claim 1, wherein the body portion of the valve member comprises a cylinder having the closed planar end to which the end portion is attached.

8. The device as claimed in claim 7, wherein the planar end of the body portion is perpendicular to cylindrical sides of the body portion.

9. The device as claimed in claim 8, wherein the cylindrical sides and the planar end join at a corner that is right angled on the inside of the valve member.

10. The device as claimed in claim 1, wherein the end portion is displaced inwardly from an edge of the body portion.

11. The device as claimed in claim 10, wherein the end portion is displaced inwardly from an entire perimeter of the body portion.

12. The device as claimed in claim 1, wherein the end portion comprises a recess on the side of the end portion closest to the stop.

13. The device as claimed in claim 1, wherein the end portion comprises an annulus that projects from the body portion of the valve member towards the stop.

14. The device as claimed in claim 1, wherein the end portion and the body portion of the valve member join at a corner having an external surface that comprises a fillet.

15. The device as claimed in claim 1, wherein the end portion projects from the body portion towards the stop by a distance that is equal to the distance by which the end portion is displaced from the edge of the body portion.

16. The device as claimed in claim 1, wherein the stop and the end portion of the valve member each comprise complementary mating surfaces that are arranged to come into contact with each other.

17. The device as claimed in claim 1, wherein the stop comprises a planar surface against which the end portion of the valve member is arranged to contact.

18. The device as claimed in claim 1, wherein the end portion comprises a planar face that is arranged to come into contact with the stop.

19. The device as claimed in claim 1, further comprising a casing attached to the housing and/or to the flange, wherein the casing comprises the stop.

20. The device as claimed in claim 19, wherein the casing surrounds the valve member.

* * * * *